United States Patent
Casperson

(10) Patent No.: US 10,088,694 B1
(45) Date of Patent: Oct. 2, 2018

(54) ROLLED ELASTOMERIC TUBULAR CASINGS FOR EYEWEAR

(71) Applicant: Regina B. Casperson, Jenkins, MN (US)

(72) Inventor: Regina B. Casperson, Jenkins, MN (US)

(*) Notice: Subject to any disclaimer, the term of this patent is extended or adjusted under 35 U.S.C. 154(b) by 76 days.

(21) Appl. No.: 14/708,142

(22) Filed: May 8, 2015

Related U.S. Application Data

(60) Provisional application No. 61/990,681, filed on May 8, 2014.

(51) Int. Cl.
*G02C 11/00* (2006.01)
*G02C 5/14* (2006.01)
*G02C 11/02* (2006.01)

(52) U.S. Cl.
CPC .............. *G02C 11/00* (2013.01); *G02C 5/14* (2013.01); *G02C 5/143* (2013.01); *G02C 11/02* (2013.01)

(58) Field of Classification Search
CPC .......... G02C 11/02; G02C 11/00; G02C 5/00; G02C 5/143
USPC .................................................... 351/122, 52
See application file for complete search history.

(56) References Cited

U.S. PATENT DOCUMENTS

| | | |
|---|---|---|
| 46,408 A | 2/1865 | Towers |
| 64,230 A | 4/1867 | Laighton |
| 74,070 A | 2/1868 | Fletcher |
| 128,559 A | 7/1872 | Munroe |
| 144,115 A | 10/1873 | Lees |
| 171,106 A | 12/1875 | Donaldson |
| 179,171 A | 6/1876 | Eager |
| 228,363 A | 6/1880 | Lambert |
| 278,097 A | 5/1883 | Collins |
| 281,541 A | 7/1883 | Mather |
| 304,840 A | 9/1884 | McIver |
| 350,774 A | 10/1886 | Seel |
| 353,456 A | 11/1886 | Leyden |
| 356,578 A | 1/1887 | Durling |
| 363,352 A | 5/1887 | Avery |

(Continued)

OTHER PUBLICATIONS

Ramirez, Anthony. Turning Profits Hand Over Wrist. NY Times. Oct. 27, 1990. http://www.nytimes.com/1990/10/27/business/turning-profits-hand-over-wrist.html?pagewanted=all.*

(Continued)

*Primary Examiner* — Ricky Mack
*Assistant Examiner* — Kristina Deherrera
(74) *Attorney, Agent, or Firm* — Albert W. Watkins

(57) ABSTRACT

An elastomeric tubular casing encompasses an elongate eyeglasses temple. The elastomeric tubular casing has a tube interior; a tube exterior; and tube first and second ends. The tube interior is configured to have higher than standard adhesion, and the tube exterior is configured to have lower than standard adhesion. Bevels may be provided adjacent to the tube first and second ends. The elastomeric tube in a first post-production orientation is rolled into a doughnut geometry, and adapted to unroll about the elongate eyeglasses temple to resume a generally cylindrical tubular geometry, and thereby encase a portion of the eyeglasses temple. The elastomeric tubular casing has an interior diameter approximately equal to an exterior circumference of the eyeglasses temple and the elastomeric tubular casing extends longitudinally co-extensively with the eyeglasses temple.

17 Claims, 5 Drawing Sheets

(56) References Cited

U.S. PATENT DOCUMENTS

| | | |
|---|---|---|
| 491,350 A | 2/1893 | Hensel |
| 509,661 A | 11/1893 | Hensel |
| 575,362 A | 1/1897 | Luther et al. |
| 598,704 A | 2/1898 | Goodenow |
| 701,305 A | 6/1902 | Daughtry |
| 713,149 A | 11/1902 | Quarmby |
| 753,499 A | 3/1904 | Klarle |
| 767,891 A | 8/1904 | Isakson |
| 785,561 A | 3/1905 | Latimer |
| 819,884 A | 5/1906 | Higgins |
| 839,346 A | 12/1906 | Wardman |
| 849,921 A | 4/1907 | Schelling |
| 872,355 A | 12/1907 | Le Maire |
| 931,949 A | 8/1909 | Morrow |
| 958,168 A | 5/1910 | Petersen |
| D52,587 S | 10/1918 | Patterson |
| 1,280,984 A | 10/1918 | Goslee |
| 1,330,256 A | 2/1920 | Gay |
| 1,371,637 A | 3/1921 | Meredith |
| 1,413,247 A | 4/1922 | Wilson |
| 1,419,370 A | 6/1922 | Genaille |
| 1,455,879 A | 5/1923 | Gronlund |
| 1,476,348 A | 12/1923 | Miller |
| 1,492,935 A | 5/1924 | Philips |
| 1,504,043 A | 8/1924 | Hidock |
| 1,509,781 A | 9/1924 | Roth |
| 1,517,342 A | 12/1924 | Burlingame |
| 1,622,668 A | 3/1927 | Poeton et al. |
| 1,686,297 A | 10/1928 | Trimble |
| 1,823,412 A | 9/1931 | Schwarze |
| 2,024,533 A | 12/1935 | Manoogian |
| D103,372 S | 2/1937 | Kowal |
| 2,101,521 A | 12/1937 | Topiel |
| 2,109,248 A | 2/1938 | Hibshman |
| 2,120,687 A | 6/1938 | Tarson |
| 2,189,467 A | 2/1940 | Jacobs |
| D121,457 S | 7/1940 | Nu Dell |
| 2,214,105 A | 9/1940 | Hordiner |
| 2,230,067 A | 1/1941 | Pedlow |
| 2,239,356 A | 4/1941 | Felch |
| 2,294,840 A | 9/1942 | Dunn |
| 2,410,208 A | 10/1946 | Gauldin |
| 2,436,101 A | 2/1948 | Dirlam et al. |
| 2,449,235 A | 9/1948 | Krupp |
| 2,502,734 A * | 4/1950 | Lyons .................. G02C 5/143 351/122 |
| 2,571,270 A | 10/1951 | Marchese |
| 2,581,366 A | 1/1952 | De Grazia |
| 2,632,219 A | 3/1953 | Massey |
| 2,636,236 A | 4/1953 | Peterson |
| 2,667,906 A | 2/1954 | Stiller |
| 2,696,725 A | 12/1954 | De Cecco |
| 2,762,056 A | 9/1956 | Glagovsky |
| 2,953,828 A | 9/1960 | Hochman |
| 2,967,340 A | 1/1961 | Pernecky, Jr. |
| 2,991,561 A | 7/1961 | Moore et al. |
| 3,038,375 A | 6/1962 | Gansz |
| 3,098,375 A | 7/1963 | Friedler |
| 3,296,669 A | 1/1967 | Elder, Jr. |
| 3,473,198 A | 10/1969 | Meier |
| 3,584,349 A | 6/1971 | Shubart |
| 3,616,498 A | 11/1971 | Rosenthal |
| 3,650,059 A | 3/1972 | Johnson |
| 3,684,356 A | 8/1972 | Bates |
| 3,687,793 A | 8/1972 | Bright |
| 3,688,348 A | 9/1972 | Klotz et al. |
| 3,744,105 A | 7/1973 | Laurita |
| 3,757,388 A | 9/1973 | Wolny |
| 3,887,968 A | 6/1975 | Lynam |
| 3,894,173 A | 7/1975 | Andrews |
| 3,940,873 A | 3/1976 | Lawless |
| 3,993,403 A | 11/1976 | Brown |
| 4,107,830 A | 8/1978 | Thomson |
| 4,133,604 A | 1/1979 | Fuller |
| 4,143,422 A | 3/1979 | Wilson |
| 4,234,090 A | 11/1980 | Barbieri et al. |
| 4,252,244 A | 2/1981 | Christian et al. |
| 4,336,087 A | 6/1982 | Martuch et al. |
| 4,375,911 A | 3/1983 | Bononi |
| 4,406,042 A | 9/1983 | McPhee |
| 4,412,369 A | 11/1983 | Carnaghi |
| 4,563,066 A | 1/1986 | Bononi |
| 4,586,610 A | 5/1986 | Gandolfo |
| 4,652,842 A | 3/1987 | Kling et al. |
| 4,680,835 A | 7/1987 | Horng |
| 4,691,986 A | 9/1987 | Aberson, Jr. et al. |
| D292,442 S | 10/1987 | Wadsworth |
| 4,764,119 A | 8/1988 | Miraglia |
| 4,786,158 A | 11/1988 | Barfus-Shanks et al. |
| 4,818,094 A | 4/1989 | Lyons |
| 4,884,807 A | 12/1989 | Welch |
| 4,901,452 A | 2/1990 | Wang |
| 4,941,434 A | 7/1990 | Ellwanger |
| 4,969,242 A | 11/1990 | Carlton, Sr. |
| 4,999,888 A | 3/1991 | Miller |
| 5,029,370 A | 7/1991 | Martinez Gimeno |
| 5,029,371 A | 7/1991 | Rosenblood et al. |
| D322,446 S | 12/1991 | Bell, Jr. |
| D331,517 S | 12/1992 | Warner |
| D331,681 S | 12/1992 | Schaefer et al. |
| 5,170,573 A | 12/1992 | Clinch |
| 5,209,439 A | 5/1993 | Coll |
| D346,895 S | 5/1994 | Martin |
| 5,388,598 A | 2/1995 | Whitten |
| 5,440,355 A | 8/1995 | Ross |
| 5,440,788 A | 8/1995 | Boden |
| 5,457,854 A | 10/1995 | Easom |
| D365,432 S | 12/1995 | Buccelli |
| D365,917 S | 1/1996 | Armstrong |
| D366,355 S | 1/1996 | Wade |
| D366,553 S | 1/1996 | Wade |
| 5,497,789 A | 3/1996 | Zook |
| 5,524,327 A | 6/1996 | Mickel et al. |
| 5,526,551 A | 6/1996 | Herman |
| 5,535,448 A | 7/1996 | Williamson et al. |
| 5,583,585 A | 12/1996 | Sternberg et al. |
| 5,619,778 A | 4/1997 | Sloot |
| 5,625,925 A | 5/1997 | Richards |
| 5,671,517 A | 9/1997 | Gourley |
| D389,853 S | 1/1998 | Kosakowski |
| 5,713,080 A | 2/1998 | Tate |
| D396,202 S | 7/1998 | Lindsay |
| 5,778,500 A | 7/1998 | Illingworth |
| 5,832,574 A | 11/1998 | Shin |
| D404,449 S | 1/1999 | Burger |
| 5,873,183 A | 2/1999 | Posner |
| D406,692 S | 3/1999 | Shin |
| D407,553 S | 4/1999 | Resch |
| D407,554 S | 4/1999 | Resch |
| 5,913,483 A | 6/1999 | Polk |
| D412,544 S | 8/1999 | Burger |
| 5,946,779 A | 9/1999 | Chen |
| 6,045,469 A | 4/2000 | Gleason et al. |
| 6,167,599 B1 | 1/2001 | Chen |
| D438,094 S | 2/2001 | Ishii |
| 6,189,186 B1 | 2/2001 | Boden |
| 6,192,559 B1 | 2/2001 | Munsell, Jr. |
| 6,202,443 B1 | 3/2001 | Grosser-Samuels |
| 6,212,743 B1 | 4/2001 | Cohen |
| 6,270,217 B1 | 8/2001 | Lizzi |
| 6,338,186 B1 | 1/2002 | Kleinmann |
| 6,381,816 B1 | 5/2002 | Lai et al. |
| 6,398,085 B2 * | 6/2002 | Foster ............... B05C 17/00516 220/796 |
| 6,412,117 B1 | 7/2002 | Holmes et al. |
| 6,427,298 B1 | 8/2002 | Tseng |
| 6,442,762 B1 | 9/2002 | Neumann |
| 6,470,542 B1 | 10/2002 | Giannini |
| 6,474,858 B1 | 11/2002 | Liao |
| 6,484,535 B2 | 11/2002 | Grosser-Samuels |
| D467,178 S | 12/2002 | Drapeau |
| 6,513,210 B1 | 2/2003 | Gonzalez |
| 6,601,273 B1 | 8/2003 | Raymond |
| 6,622,358 B1 | 9/2003 | Christy |

(56) References Cited

U.S. PATENT DOCUMENTS

| | | |
|---|---|---|
| 6,681,459 B1 | 1/2004 | Curet et al. |
| 6,796,008 B1 | 9/2004 | Huang |
| 6,820,739 B1 | 11/2004 | Spitzer |
| 6,839,994 B2 | 1/2005 | Proctor |
| 6,895,696 B1 | 5/2005 | Sanders |
| 6,964,625 B2 | 11/2005 | Murphy et al. |
| 6,968,602 B2 | 11/2005 | Lee et al. |
| D514,625 S | 2/2006 | Segura |
| 7,021,759 B2 | 4/2006 | Spitzer |
| 7,201,479 B2 | 4/2007 | Spitzer |
| 7,203,999 B2 | 4/2007 | Bagot |
| D545,531 S | 7/2007 | Miller et al. |
| D548,432 S | 8/2007 | Martin |
| 7,251,868 B2 | 8/2007 | Curet et al. |
| D550,430 S | 9/2007 | Martin, Jr. |
| 7,395,586 B1 | 7/2008 | Gibson |
| D580,129 S | 11/2008 | Kimball |
| D593,146 S | 5/2009 | Powless |
| D593,314 S | 6/2009 | Stewart-White |
| D594,643 S | 6/2009 | Moore |
| D601,790 S | 10/2009 | Kennedy |
| D606,296 S | 12/2009 | Mouton |
| 7,631,399 B2 | 12/2009 | Soumi |
| D613,938 S | 4/2010 | Alexander |
| D614,855 S | 5/2010 | Inohara et al. |
| 7,708,400 B2 | 5/2010 | Coleman et al. |
| D616,790 S | 6/2010 | Mear |
| D617,233 S | 6/2010 | Bolton |
| D617,538 S | 6/2010 | DeMichele |
| D618,272 S | 6/2010 | Daniel |
| D619,637 S | 7/2010 | Vanne |
| 7,779,519 B2 | 8/2010 | Ashwood, Jr. |
| 7,976,154 B2 | 7/2011 | Daniel |
| 8,109,968 B2 | 2/2012 | Ashley et al. |
| D655,743 S | 3/2012 | Abrahamoff |
| 8,132,433 B2 | 3/2012 | Andersen |
| D662,703 S | 7/2012 | Haver |
| 8,311,260 B2 | 11/2012 | Miller |
| 8,371,004 B2 | 2/2013 | Huber et al. |
| D683,662 S | 6/2013 | Vloemans |
| 2001/0043308 A1 | 11/2001 | Menuck et al. |
| 2013/0278882 A1* | 10/2013 | Stewart .................. G02C 5/143 351/123 |

OTHER PUBLICATIONS

"Torus"; Wikipedia; http://en.wikipedia.org/wiki/Torus; 12 pgs.
"Archimedean spiral"; Wikipedia; http://en.wikipedia.org/wiki/Archimedean_spiral; 4 pgs.
"Doughnut", Webster's New Universal Unabridged Dictionary, 1983, p. 549.

* cited by examiner

ROLLED ELASTOMERIC TUBULAR CASINGS FOR EYEWEAR

CROSS REFERENCE TO RELATED APPLICATIONS

The present application claims the benefit of U.S. provisional patent application 61/990,681 filed May 8, 2014 of like inventorship, the teachings and entire contents which are incorporated herein by reference.

BACKGROUND OF THE INVENTION

1. Field of the Invention

The present invention pertains generally to optical equipment, and more particularly to an ophthalmic article temple element or attachment.

2. Description of the Related Art

Eyeglasses were once considered a detraction from the appearance of a person. However, with the vast improvements in designs, including involvement by many premier designers, eyeglasses have moved from being unpopular to being vogue. The glasses may be prescription or corrective lens, sun or ultraviolet blocking, or other types of glasses. In each case, modern designs have greatly expanded the appeal of such eyewear.

When a person purchases eyewear, most prior art frames are fabricated from a single material. This material may commonly be nylon or a titanium composition, though much less frequently other compositions may be used. These most common frame compositions tend to be hard, slippery, and cold. When a pair of glasses are removed from one's face, this is usually accomplished by grasping the forward portion of the bow or temple with a single hand, or with greater care that some people exert, with both hands, one on each respective forward temple portion. Next, the glasses will either be folded up and stored in a case, or commonly placed upon a surface. When a person is doing this with a single hand, the glasses frame will be lowered onto the surface, not always as gently as may be desired, and the temple-frame junction opposite to the hand holding the glasses will often contact the table top or other surface.

Whatever design that is embodied in the glasses frames, including the temples is static. This is not to say, as noted above, that this is necessarily bad. Nevertheless, there are times when an individual might wish to express their individuality, and they simply cannot do so with stock or commercially sold designer frames.

A large number of U.S. patents are incorporated herein by reference. These patents illustrated various structures, various manufacturing techniques, materials, and the like, the teachings and contents of each which are incorporated herein by reference without limitation: U.S. Pat. No. 4,143,422 by Wilson, entitled "String tie and ornamental fastening"; U.S. Pat. No. 4,336,087 by Martuch et al, entitled "Method of marking fishing lines"; U.S. Pat. No. 5,619,778 by Sloot, entitled "Reflective shoe laces and method for making same"; U.S. Pat. No. 5,713,080 by Tate, entitled "Clothing ornamentation device"; Des 331,517 by Warner, entitled "Window blind grip"; Des 331,681 by Schaefer et al, entitled "Window blind grip"; Des 346,895 by Martin, entitled "Lace for footwear"; 849,921 by Schelling, entitled "Fastener for tapes, shoe laces, elastics, and other articles"; U.S. Pat. No. 1,504,043 by Hidock, entitled "Shoe-lace holder for shoes"; U.S. Pat. No. 6,338,186 by Kleinmann, entitled "Device for retaining and/or blocking shoelaces in particular for sport shoes"; U.S. Pat. No. 6,427,298 by Tseng, entitled "Shoelace anglet"; U.S. Pat. No. 6,470,542 by Giannini, entitled "Device and method for tassels"; U.S. Pat. No. 6,622,358 by Christy, entitled "Lace tightening article"; U.S. Pat. No. 7,395,586 by Gibson, entitled "Shoelace retention device"; Des 407,553 by Resch, entitled "Shoe lace"; Des 407,554 by Resch, entitled "Shoe lace"; 74,070 by Fletcher, entitled "Cotton bale tie"; 278,097 by Collins, entitled "Wire coupling"; 304,840 by McIver, entitled "Strap fastener"; 353,456 by Leyden, entitled "Bag fastener and tag holder"; 356,578 by Durling, entitled "Wire hoop"; 363,352 by Avery, entitled "Connecting device for harness straps for looms"; 701,305 by Daughtry, entitled "Holder for handles of kitchen utensils"; 753,499 by Klarle, entitled "Means for lowering loads applicable as life saving apparatus"; 785,561 by Latimer, entitled "Wiring cleat"; 872,355 by Le Maire, entitled "Securing device for ropes"; 958,168 by Petersen, entitled "Line holder"; U.S. Pat. No. 1,330,256 by Gay, entitled "String-fastener"; U.S. Pat. No. 1,686,297 by Trimble, entitled "Window-shade pull-cord clip"; U.S. Pat. No. 2,762,056 by Glagovsky, entitled "Tassel"; U.S. Pat. No. 3,688,348 by Klotz et al, entitled "Method and article for fastening socks together"; U.S. Pat. No. 4,406,042 by McPhee, entitled "Tubing clip"; U.S. Pat. No. 4,941,434 by Ellwanger, entitled "Quick connect retaining leash"; U.S. Pat. No. 5,209,439 by Coll, entitled "Drop wire clamp"; U.S. Pat. No. 5,524,327 by Mickel et al, entitled "Malleable clip"; U.S. Pat. No. 5,625,925 by Richards, entitled "Line connecting device"; U.S. Pat. No. 6,601,273 by Raymond, entitled "Line securing assembly"; U.S. Pat. No. 7,631,399 by Soumi, entitled "Cable holder"; U.S. Pat. No. 8,109,968 by Ashley et al, entitled "Suture lock"; 281,541 by Mather, entitled "Lacing for gloves"; 350,774 by Seel, entitled "Trimming"; U.S. Pat. No. 3,744,105 by Laurita, entitled "Drawstring construction"; U.S. Pat. No. 5,388,598 by Whitten, entitled "Hair restraint"; U.S. Pat. No. 5,440,788 by Boden, entitled "Cord lock of elastomeric material"; U.S. Pat. No. 6,202,443 by Grosser-Samuels, entitled "Adjustable jewelry"; U.S. Pat. No. 6,442,762 by Neumann, entitled "Chin strap for a cap and combination thereof"; U.S. Pat. No. 6,484,535 by Grosser-Samuels, entitled "Adjustable jewelry assembly"; U.S. Pat. No. 8,311,260 by Miller, entitled "Miniature stereo audio earphones"; Des 121,457 by Nu Dell, entitled "Sport bonnet"; Des 365,432 by Buccelli, entitled "Decorative head wrap"; Des 366,355 by Wade, entitled "Necktie"; Des 366,553 by Wade, entitled "Necktie"; Des 514,625 by Segura, entitled "Sling sleeve"; Des 580,129 by Kimball, entitled "Women's stocking hat"; Des 594,643 by Moore, entitled "Shoestring"; Des 617,538 by DeMichele, entitled "Knitted hat"; 179,171 by Eager, entitled "Overalls"; U.S. Pat. No. 4,412,369 by Carnaghi, entitled "Hook-like end for drawstring"; 598,704 by Goodenow, entitled "Shoe lace fastener"; 819,884 by Higgins, entitled "Shoestring fastener"; 839,346 by Wardman, entitled "Line test connector"; U.S. Pat. No. 1,280,984 by Goslee, entitled "Shoe lace clip"; U.S. Pat. No. 1,823,412 by Schwarze, entitled "Detachable head for the free ends of laces"; U.S. Pat. No. 2,581,366 by De Grazia, entitled "Hood gathering means"; U.S. Pat. No. 2,967,340 by Pernecky, J R, entitled "Glove and like article holder"; U.S. Pat. No. 4,969,242 by Carlton SR, entitled "Tied shoelace shield"; U.S. Pat. No. 5,029,370 by Martinez Gimeno, entitled "Shoe closure"; U.S. Pat. No. 6,192,559 by Munsell, entitled "Shoelace fastening apparatus"; U.S. Pat. No. 6,381,816 by Lai et al, entitled "Fabric strap retainer"; U.S. Pat.

No. 7,779,519 by Ashwood, entitled "Accessory for shoelaces"; Des 406,692 by Shin, entitled "Footwear string"; Des 438,094 by Ishii, entitled "End cover for strings"; Des 601,790 by Kennedy, entitled "Decorative shoe accessory"; Des 606,296 by Mouton, entitled "Threaded shoe lace"; Des 614,855 by Inohara et al, entitled "Shoe lace system"; Des 662,703 by Haver, entitled "Shoe lace ornament"; U.S. Pat. No. 2,436,101 by Dirlam et al, entitled "Replaceable optical temple cover"; U.S. Pat. No. 2,294,840 by Dunn, entitled "Spectacles"; U.S. Pat. No. 3,993,403 by Brown, entitled "Insulated fitting sheath for eyeglass temples"; U.S. Pat. No. 4,375,911 by Bononi, entitled "Coating for eyeglasses"; U.S. Pat. No. 4,563,066 by Bononi, entitled "End piece of a spectacle frame earpiece"; 2001/0043308 by Menuck et al, entitled "Cover apparatus for eyeglass temple arms"; Des 618,272 by Daniel, entitled "Spectacle side-piece protector"; U.S. Pat. No. 1,622,668 by Poeton et al, entitled "Ophthalmic mounting"; U.S. Pat. No. 3,038,375 by Gansz, entitled "Spectacle float"; U.S. Pat. No. 3,684,356 by Bates, entitled "Temple boots"; U.S. Pat. No. 4,133,604 by Fuller, entitled "Eyeglass retainer"; U.S. Pat. No. 4,786,158 by Barfus-Shanks et al, entitled "Protective cover for eyeglass temple pieces and method"; U.S. Pat. No. 4,818,094 by Lyons, entitled "Eyeglass retainer"; U.S. Pat. No. 5,440,355 by Ross, entitled "Comfortable eyeglass cover"; U.S. Pat. No. 5,583,585 by Sternberg et al, entitled "Protective cover for eyeglass temple pieces and method of making the same"; U.S. Pat. No. 6,270,217 by Lizzi, entitled "Eyeglass frame protector dispensing system and method"; U.S. Pat. No. 6,796,008 by Huang, entitled "Reflectorized lace and the like"; U.S. Pat. No. 6,820,739 by Spitzer, entitled "Protective sleeve for eyeglasses"; U.S. Pat. No. 7,021,759 by Spitzer, entitled "Protective sleeve for eyeglasses"; U.S. Pat. No. 7,201,479 by Spitzer, entitled "Protective sleeve for eyeglasses"; U.S. Pat. No. 7,708,400 by Coleman et al, entitled "Protective temple covering"; U.S. Pat. No. 7,976,154 by Daniel, entitled "Method for protecting spectacles arms, member board and method for making the members"; Des 322,446 by Bell, entitled "Eyeglass temple covers"; Des 389,853 by Kosakowski, entitled "Eyeglass sidebar protector"; Des 593,146 by Powless, entitled "Protective temple sleeve for eyeglasses"; Des 619,637 by Vanne, entitled "Buoyant eyeglass string holder"; Des 655,743 by Abrahamoff, entitled "Eyeglass arm protector"; Des 548,432 by Martin, entitled "Diamond-studded kickbar"; Des 550,430 by Martin, entitled "Fashion accessory"; Des 616,790 by Mear, entitled "Accessory for attachment to a belt or strap"; Des 617,233 by Bolton, entitled "Sleeve for a strap"; 171,106 by Donaldson, entitled "Vulcanized rubber-handles for dental tools, etc."; U.S. Pat. No. 1,476,348 by Miller, entitled "Shoe lacing"; 46,408 by Towers, entitled "Shoe fastening"; 64,230 by Laighton, entitled "Curtain tassel"; 128,559 by Munroe, entitled "Costumery"; 144,115 by Lees, entitled "Tassel-tops"; 228,363 by Lambert, entitled "Flitters for milliner trimmings"; 491,350 by Hensel, entitled "Pendant for dress trimmings"; 509,661 by Hensel, entitled "Upholstery ball, tassel, etc."; 575,362 by Luther et al, entitled "Glove fastener"; 713,149 by Quarmby, entitled "Eyelet"; 767,891 by Isakson, entitled "Shoe lace"; 931,949 by Morrow, entitled "Lace"; U.S. Pat. No. 1,413,247 by Wilson, entitled "Pendant"; U.S. Pat. No. 1,419,370 by Genaille, entitled "Bracelet"; U.S. Pat. No. 1,455,879 by Gronlund, entitled "Guard for writing implements"; U.S. Pat. No. 1,492,935 by Philips, entitled "Girdle"; U.S. Pat. No. 1,509,781 by Roth, entitled "Combined leash and whip"; U.S. Pat. No. 1,517,342 by Burlingame, entitled "Lacing tip"; U.S. Pat. No. 2,101,521 by Topiel, entitled "Trimming material"; U.S. Pat. No. 2,109,248 by Hibshman, entitled "Headwear"; U.S. Pat. No. 2,120,687 by Tarson, entitled "Means for making a decorative design"; U.S. Pat. No. 2,214,105 by Hordiner, entitled "Garment"; U.S. Pat. No. 2,239,356 by Felch, entitled "Tassel"; U.S. Pat. No. 2,449,235 by Krupp, entitled "Cord holder"; U.S. Pat. No. 2,632,219 by Massey, entitled "Elastic fastener for cord, fabric, and the like"; U.S. Pat. No. 2,636,236 by Peterson, entitled "Cord slider"; U.S. Pat. No. 3,687,793 by Bright, entitled "Finely molded decorative and structural articles"; U.S. Pat. No. 3,887,968 by Lynam, entitled "Composite elastic band for use with a garment"; U.S. Pat. No. 4,764,119 by Miraglia, entitled "Learning device and method of using same"; U.S. Pat. No. 4,884,807 by Welch, entitled "Pile-surfaced ball and method of making the same"; U.S. Pat. No. 4,901,452 by Wang, entitled "Shoe with adaptable overlay"; U.S. Pat. No. 5,457,854 by Easom, entitled "Draw-cord and methods of incorporating it within a tunnel of fabric"; U.S. Pat. No. 5,526,551 by Herman, entitled "Decorative multi-part assemblies having an interconnector"; U.S. Pat. No. 5,832,574 by Shin, entitled "Footwear string end tightening acetate tube"; U.S. Pat. No. 5,873,183 by Posner, entitled "Shoe securement apparatus with lace and groove fasteners"; U.S. Pat. No. 5,946,779 by Chen, entitled "Shoelace having sections of different diameters and densities"; U.S. Pat. No. 6,167,599 by Chen, entitled "Light reflecting tag attached to ends of a shoelace"; U.S. Pat. No. 6,189,186 by Boden, entitled "Elastomeric cord lock with dual cord passages"; U.S. Pat. No. 6,212,743 by Cohen, entitled "Laces that thread easily and form a non-slip knot"; U.S. Pat. No. 6,513,210 by Gonzalez, entitled "Draw-tight elastic cordage"; U.S. Pat. No. 6,681,459 by Curet et al, entitled "Adjustable shoelace"; U.S. Pat. No. 6,964,625 by Murphy et al, entitled "Game ball lacing"; U.S. Pat. No. 6,968,602 by Lee et al, entitled "Enhanced shoelaces for maintaining tension with new process for manufacturing and products thereby"; U.S. Pat. No. 7,251,868 by Curet et al, entitled "Adjustable shoelace"; Des 52,587 by Patterson, entitled "Lingerie ribbon tip"; Des 103,372 by Kowal, entitled "Ornament for a shoe or similar article"; Des 292,442 by Wadsworth, entitled "Shoe decoration"; Des 365,917 by Armstrong, entitled "Sports cap"; Des 545,531 by Miller et al, entitled "Pair of shoelace retainers"; Des 593,314 by Stewart-White, entitled "Shoelace ornament"; and Des 613,938 by Alexander, entitled "Shoelace attachment for holding a visibly distinctive panel".

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a rolled elastomeric tubular casing and an elongate glasses temple. The rolled elastomeric tubular casing has a tube interior; a tube exterior; a tube first end; and a tube second end distal to the tube first end. The elastomeric tube in a first post-production orientation is rolled into a doughnut geometry, and adapted to unroll therefrom about the elongate glasses temple to resume a generally cylindrical tubular geometry, and thereby encase a portion of the elongate glasses temple.

In a second manifestation, the invention is a rolled elastomeric tubular casing. An elastomeric tube defines a tube interior, a tube exterior, a tube first end, and a tube second end distal to the tube first end. The tube interior further defines an adhesive surface, while the tube exterior defines a non-adhesive surface. A first gentle taper extends from a portion of the elastomeric tube exterior generally central between the tube first and second ends to the tube first end. A second gentle taper extends from a portion of the elastomeric tube exterior generally central between the tube first and second ends to the tube second end. The elastomeric tube in a first post-production orientation is rolled into a doughnut geometry, and adapted to unroll therefrom to resume a generally cylindrical tubular geometry.

OBJECTS OF THE INVENTION

Exemplary embodiments of the present invention solve inadequacies of the prior art by providing a rolled elastomeric tubular casing to be placed by unrolling onto a glasses temple. The rolled elastomeric tubular casing provides benefits for both aesthetic and functional purpose.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a covering for a glasses temple that is easy to both place upon and remove from the temple. A second object of the invention is to enable the covering to stay securely where placed. An additional object of the invention is to provide an exterior that is less likely to snag hair and other objects. A further object of the invention is to provide nominal protection to a glasses temple. Another object of the present invention is to incorporate various degrees of card, picture or sign exhibiting. A further object of the invention is to maker smaller or more difficult to grasp temples easier to grasp and hold. Yet another object of the present invention is to provide a unique and readily altered ornate appearance to glasses.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a rolled elastomeric tubular casing that may be applied to eyeglasses frames, and particularly to glasses temples.

In a preferred embodiment of the invention illustrated in FIGS. 1-4, elastomeric tubular casing 10 for eyewear is comprised of an elastomeric tube 11 most preferably having gentle tapers 12, 13 extending from intermediate along tube 11 to distal ends 14, 15, respectively, of tube 11. Optionally the ends 14, 15 are provided with slight bevels.

Figure 1:
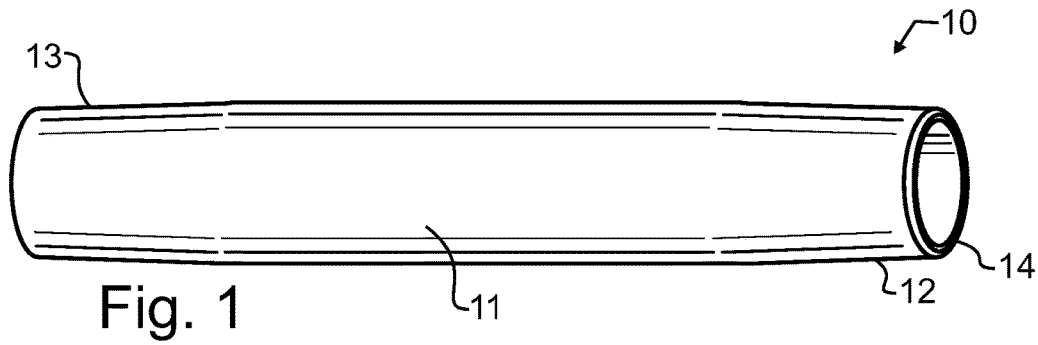
FIG. 1 illustrates a preferred embodiment rolled elastomeric tubular casing for eyewear designed in accord with the teachings of the present invention from a perspective view.
Figure 2:
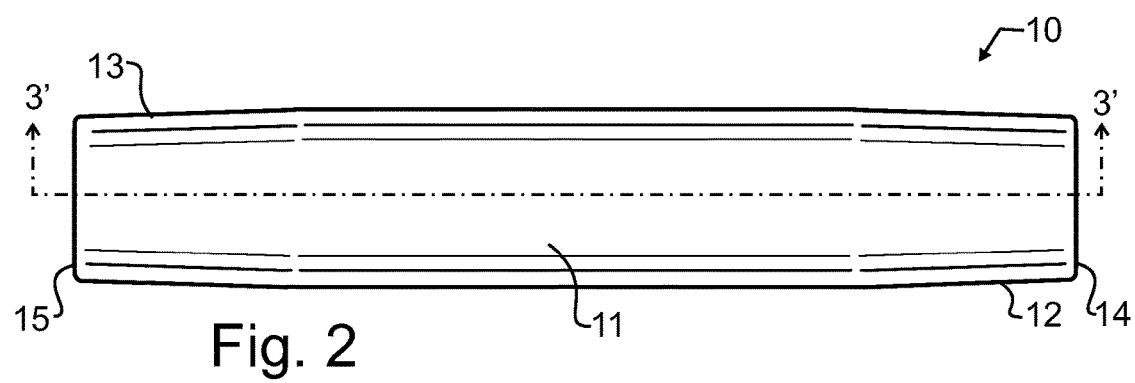
FIG. 2 illustrates the preferred embodiment rolled elastomeric tubular casing for eyewear of FIG. 1 from a top plan view.
Figure 3:
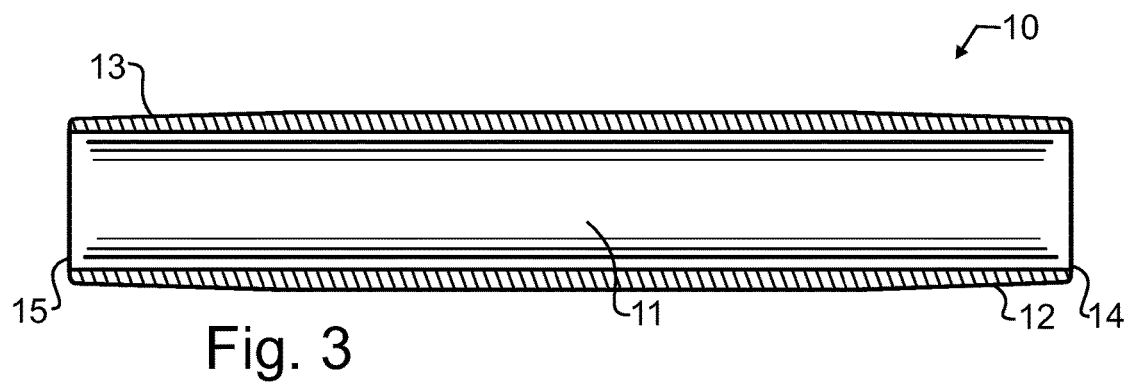
FIG. 3 illustrates the preferred embodiment rolled elastomeric tubular casing for eyewear of FIG. 1 from a sectional view taken along section line 3' of FIG. 2.
Figure 4:
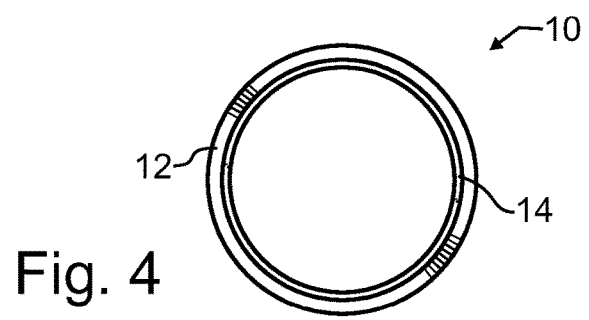
FIG. 4 illustrates the preferred embodiment rolled elastomeric tubular casing for eyewear of FIG. 1 from a right side elevational view.
Figure 5:
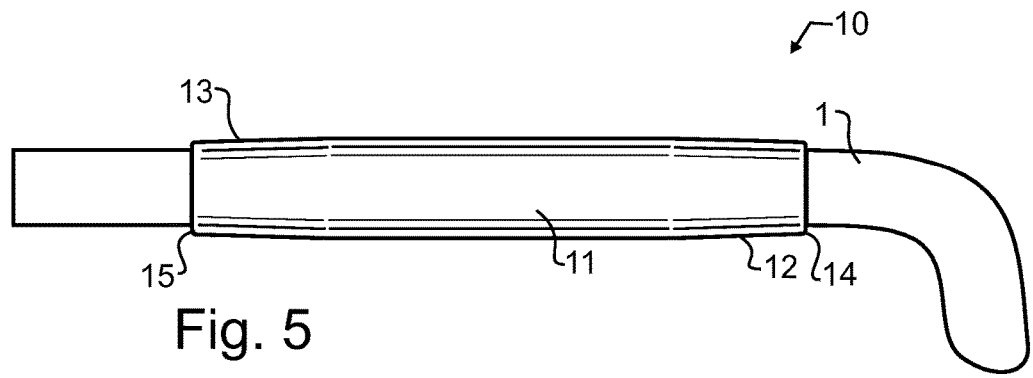
FIG. 5 illustrates the preferred embodiment rolled elastomeric tubular casing for eyewear of FIG. 1 in further combination with a glasses temple from a top plan view.
Figure 6:
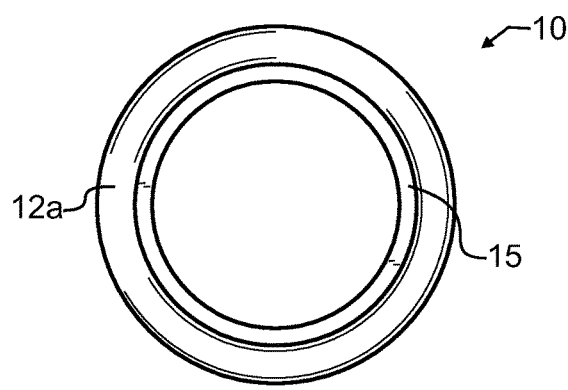
FIG. 6 illustrates the preferred embodiment rolled elastomeric tubular casing for eyewear of FIG. 1 in a partially rolled configuration from a left side elevational view.
Figure 7:
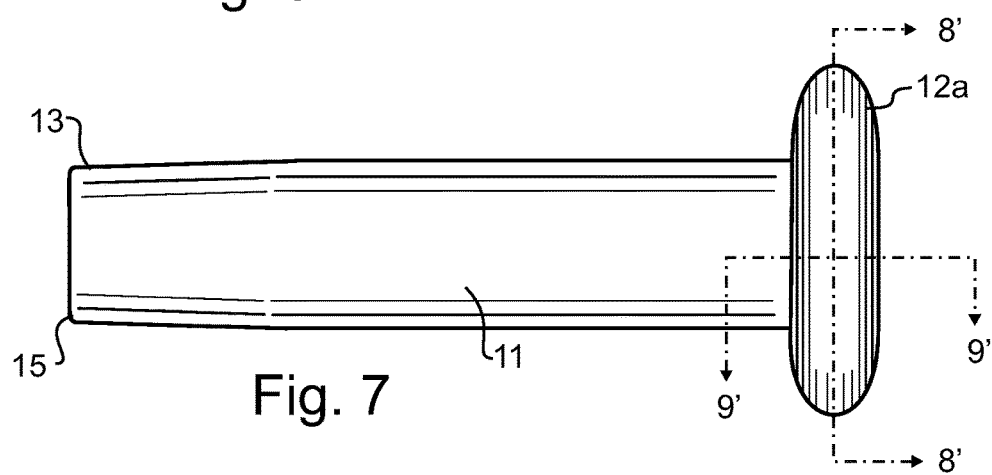
FIG. 7 illustrates the preferred embodiment rolled elastomeric tubular casing for eyewear of FIG. 6 in a partially rolled configuration from a top plan view.

FIG. 5 illustrates preferred embodiment elastomeric tubular casing 10 in further combination with, co-extensive with, and generally co-axial about a bow or temple 1. The particular temple 1 will be understood herein to include not only such as may be found on prescription eyeglasses, but also on other types of glasses, including for exemplary and non-limiting purposes sun glasses, protective eyewear, and fashion eyewear.

Preferred embodiment elastomeric tubular casing 10 performs a number of useful and beneficial functions when used in combination with a temple 1 or the like. The enlarged diameter and improved feel provided by preferred embodiment elastomeric tubular casing 10 makes articles easier to grasp and hold. This can be particularly beneficial to young children, elderly persons, and any other persons who would like to more easily grasp and hold eyewear or the like. In addition, a preferred embodiment elastomeric tubular casing 10 may incorporate various degrees of card, picture or sign exhibiting, such as custom logos or the like displayed along the exterior of elastomeric tube 11. Furthermore, a preferred embodiment elastomeric tubular casing 10 may be used to provide an ornate appearance to otherwise utilitarian articles. In this case, the exterior diameter of elastomeric tube 11 might, for exemplary and non-limiting purposes, be of varying diameter rather than the constant outside diameter illustrated in the present Figures. Similarly, diverse colors, fills such as glitter or the like, and patterns may be used to provide further ornamentation. While only one preferred embodiment elastomeric tubular casing 10 is illustrated as being affixed with temple 1 in FIG. 5, it will be understood herein that as many tubular casings 10 may be applied to a temple 1 or the like as desired by a person. Particularly where there are a variety of ornamentations available in otherwise functionally similar tubular casings 10, a person can generate diverse and unique appearance along the length of temple 1.

Gentle tapers 12, 13 and bevels at ends 14, 15 each form a more gradual transition between temple 1 and the preferred embodiment elastomeric tubular casing 10. This is felt to be both aesthetically pleasing, and also functionally more proficient, since preferred embodiment elastomeric tubular casing 10 will be less likely to snag hair, or become rolled or otherwise entangled with hair and other objects.

In accord with the teachings of the present invention, a suitable material for preferred embodiment elastomeric tubular casing 10 will be one which is elastomeric, permitting limited flexure. Furthermore, elastomeric materials impact other objects with a softened, deadened and ordinarily non-marring blow. Elastomers are a broad class of materials, and may for exemplary and non-limiting purposes include both natural and synthetic rubbers, as well as certain co-polymers, highly plasticized polymers, and certain highly cross-linked polymers. They are typically characterized by glass transition temperatures that are well below room temperature, meaning that at room temperature they exist in a rubber-like state.

Figure 8:
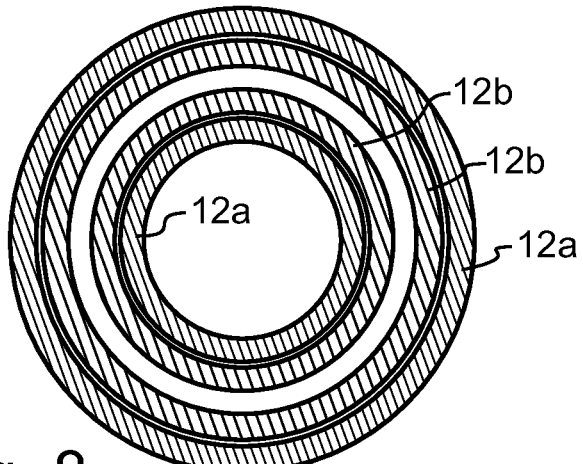
FIG. 8 illustrates the preferred embodiment rolled elastomeric tubular casing for eyewear of FIG. 6 in a partially rolled configuration from a sectional view taken along section line 8' of FIG. 7.
Figure 9:
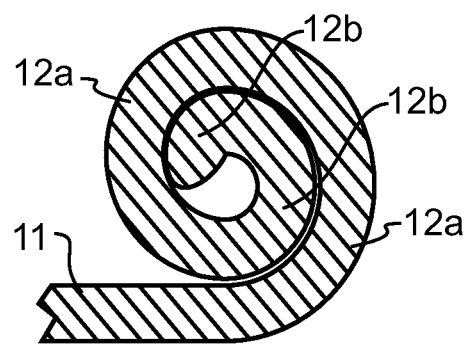
FIG. 9 illustrates the preferred embodiment rolled elastomeric tubular casing for eyewear of FIG. 6 in a partially rolled configuration from a sectional view taken along section line 9' of FIG. 7.
Figure 10:
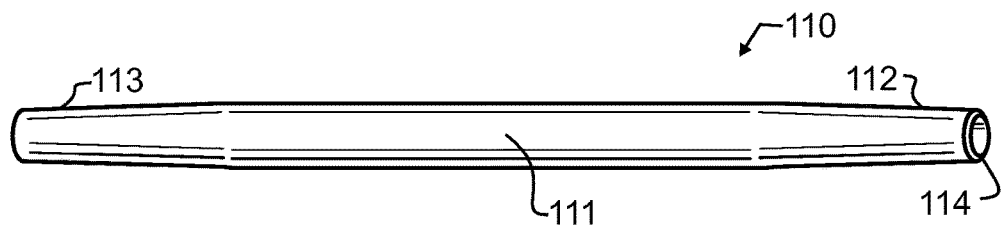
FIG. 10 illustrates a first alternative embodiment elastomeric tubular casing for drawstrings designed in accord with the teachings of the present invention from a perspective view.
Figure 11:
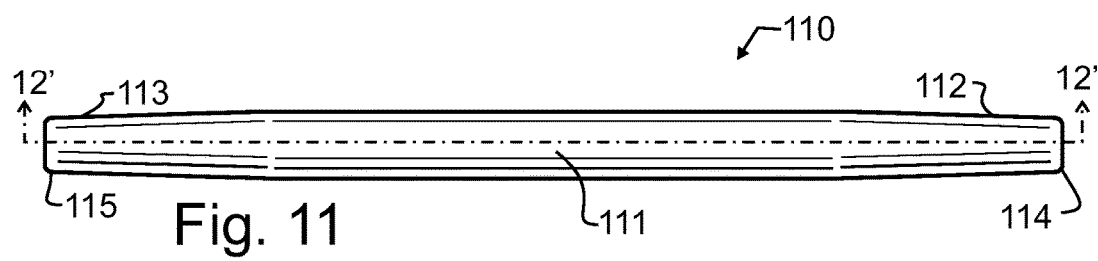
FIG. 11 illustrates the first alternative embodiment rolled elastomeric tubular casing for eyewear of FIG. 10 from a top plan view.
Figure 12:
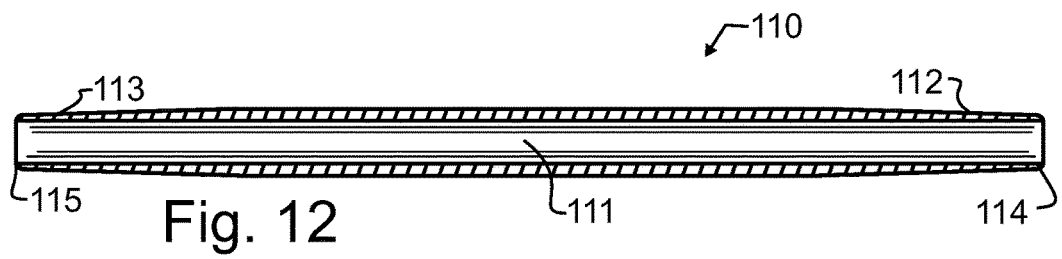
FIG. 12 illustrates the first alternative embodiment rolled elastomeric tubular casing for eyewear of FIG. 10 from a sectional view taken along section line 12' of FIG. 11.
Figure 13:
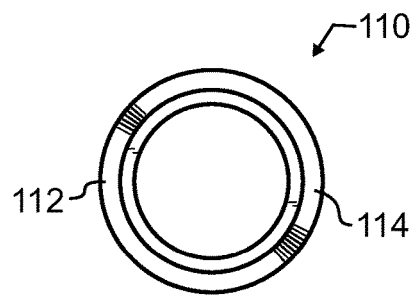
FIG. 13 illustrates the first alternative embodiment rolled elastomeric tubular casing for eyewear of FIG. 10 from a right side elevational view.

Substantial elasticity is also desirable. A preferred embodiment elastomeric tubular casing 10 may preferably be rolled at the time of production for shipment and delivery, such as illustrated in FIGS. 6-9. As shown therein, taper 12 has been substantially rolled, by beginning the roll at end 14 and rolling towards end 15. As taper 12 rolls upon itself, an increasing number of coaxial layers are defined, as shown in FIG. 8 where 12a designates the outermost rolled portion of taper 12, and 12b represents the more inner roll of taper 12. This is also apparent from FIG. 9, and, as can be understood, when taper 12 is completely rolled the balance of preferred embodiment elastomeric tubular casing 10 may also be rolled, eventually forming what might appear to be a simple "o" having left and right side elevational views similar to FIG. 6, but which actually comprises many co-axial layers such as layers 12a and 12b. As can be appreciated, this rolling requires a great deal of elasticity.

An important benefit of this rolling is the ease of application of preferred embodiment elastomeric tubular casing 10 to an eyeglass temple 1. The preferred embodiment elastomeric tubular casing 10 may simply be slid onto the eyeglass temple 1 to a desired starting position, and unrolled from there. Consequently, the fully rolled configuration is preferred for delivery to a customer for use.

Using the rolled configuration of FIGS. 6-9 enables another preferred feature, which is to provide an interior surface of the preferred embodiment elastomeric tubular casing 10 that has a very high adhesion characteristic. This helps to secure the preferred embodiment elastomeric tubular casing 10 to an article such as a temple 1 without annoying sliding or slipping that may otherwise require frequent and sometimes difficult readjustments. The adhesion characteristic may be obtained in any suitable way, but will preferably be enduring. For exemplary purposes only, and not solely limiting thereto, the interior surface may be chemically, mechanically or otherwise treated, or may alternatively be coated, laminated, impregnated with, or otherwise combined with another material that generates the desirable adhesion characteristic.

One particularly suitable material for preferred embodiment elastomeric tubular casing 10 that is commonly available is a silicone rubber. Most silicone compositions offer the advantages of being highly chemically inert, meaning they can withstand the use of powerful cleaning compounds and solvents that may be encountered. Furthermore, they have an exceptionally wide elastomeric temperature range, and will withstand the extremes of terrestrial cold and heat. Silicone compositions may also be customized to control the adhesion characteristic of a surface, allowing the inner surface to have a high or relatively elevated adhesion characteristic above a standard adhesion, while the outer surface may be provided with a lowered or relatively more non-stick surface relative to standard adhesion. In other words, for the purposes of the present disclosure high adhesion will be understood to include either of adhesion greater than a standard adhesion for a typical composition, or adhesion relatively higher than a second adhesion, with the second adhesion then being deemed a low or non-stick adhesion.

A non-stick exterior helps to prevent surrounding materials or objects from clinging to or becoming entangled with preferred embodiment elastomeric tubular casing 10. This can be particularly critical in the case of glasses bows, where the entanglement of hair can be extremely painful and unpleasant. Most preferably, a preferred embodiment elastomeric tubular casing 10 will have a powder-like feeling on the exterior, and a sticky feeling on the interior. This non-stick characteristic of the exterior surface may be achieved in any suitable manner. For exemplary purposes only, and not solely limiting thereto, the exterior surface may be chemically, mechanically or otherwise treated, or may alternatively be coated, laminated, impregnated with, or otherwise combined with another material that generates the desirable adhesion characteristic. In the case of a silicone composition, a mold exterior may be sandblasted or otherwise treated to roughen the surface. The resulting preferred embodiment elastomeric tubular casing 10 will exhibit less grab on the exterior if so treated.

Various embodiments of apparatus designed in accord with the present invention have been illustrated in the various figures. While FIGS. 1-9 illustrate a preferred embodiment, additional alternative embodiments are illustrated in FIGS. 10-13 and FIG. 14, respectively. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

FIGS. 10-13 illustrate a first alternative embodiment elastomeric tubular casing 110 from various views corresponding to those of FIGS. 1-4. This first alternative embodiment is very similar to the preferred embodiment elastomeric tubular casing 10 of FIG. 1, but has been designed to be of significantly smaller inside and outside diameter. As may be apparent from these FIGS. 10-13, tubular casing 110 may be sized to fit smaller circumference articles and larger circumference articles, and may have different degrees of end taper. The elastomeric tube 111, gentle tapers 112, 113, and distal ends 114, 115 are likewise of smaller outside and inside diameter, but are also otherwise similar to the corresponding components found in preferred embodiment elastomeric tubular casing 10.

Figure 14:
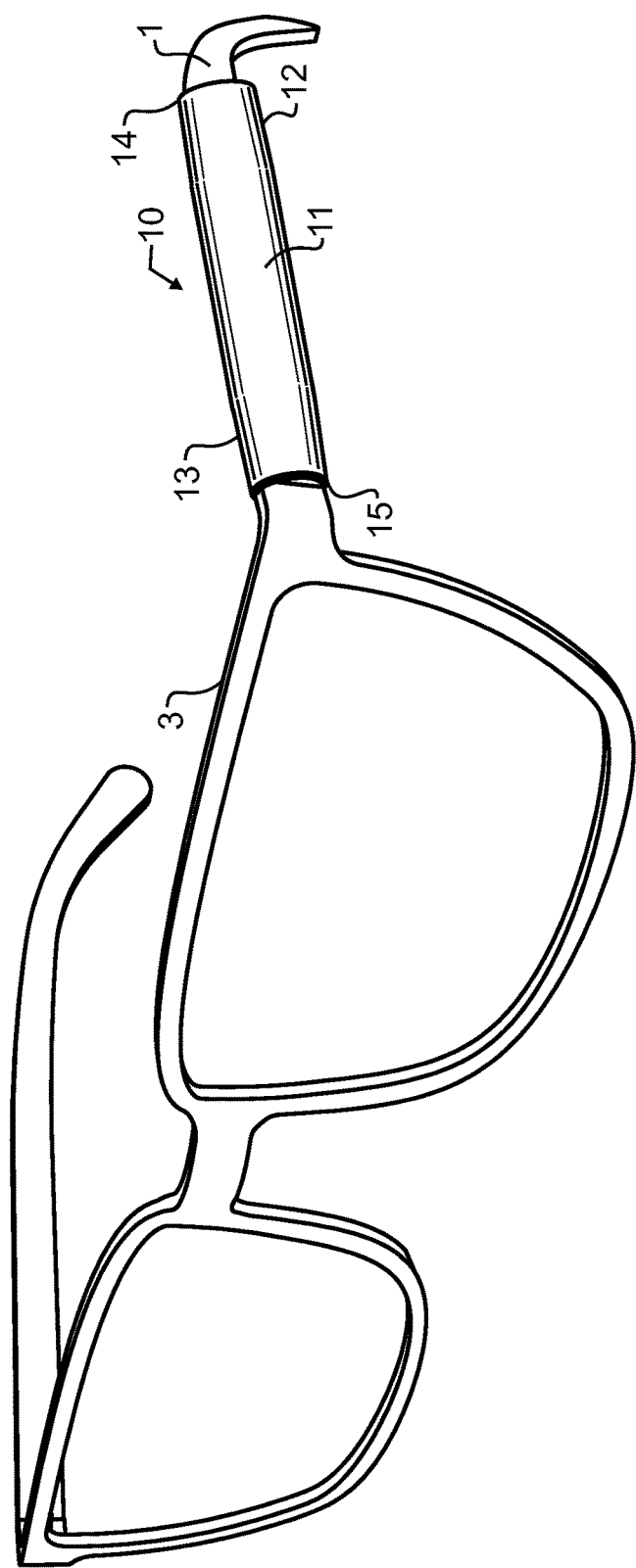
FIG. 14 illustrates the preferred embodiment rolled elastomeric tubular casing for eyewear of FIG. 1 in further combination with a prior art glasses frame from a projected view.

FIG. 14 illustrates a preferred embodiment rolled elastomeric tubular casing for glasses, in further combination with the prior art glasses frame 1. As may be appreciated from the foregoing description, this preferred embodiment rolled elastomeric tubular casing 10 will preferably be slipped over the end of the bow, and then rolled forward onto the majority of the bow. Various colors and patterns may be provided with preferred embodiment rolled elastomeric tubular casing 10 for glasses, and so a person may choose to select which one of several preferred embodiment rolled elastomeric tubular casings may be used for a particular occasion.

As an analog thereto, a combination of silicone with phosphorescent and radiant compounds offers several benefits. A first benefit comes in increased night or low-light visibility of a person wearing a preferred embodiment elastomeric tubular casing 10 so compounded. This glow can also be useful in locating missing glasses, simply by turning off the lights in an otherwise dark room.

A preferred embodiment rolled elastomeric tubular casing for glasses will extend from adjacent to the bow hinge to adjacent to the ear piece, but will preferably not cover either area, so as to not interfere with the functions of these components.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, an elastomeric tubular casing and an elongate eyeglasses temple,
    said eyeglasses temple having:
        a first earpiece end;
        a second end distal to said earpiece end; and
        a longitudinally extensive body between said first earpiece end and said temple second end;
    said elastomeric tubular casing having:
        a tube interior defining an adhesive interior surface;
        a tube exterior defining a non-stick exterior surface;
        a tube first end; and
        a tube second end distal to said tube first end;
        said elastomeric tubular casing having a first post-production rolled configuration defining an annular doughnut geometry, and having a second unrolled configuration defining a generally cylindrical tubular geometry;
    said elastomeric tubular casing encasing a portion of said elongate eyeglasses temple longitudinally extensive body intermediate between said first earpiece end and said temple second end.

2. The combination elastomeric tubular casing and elongate eyeglasses temple of claim 1, wherein said adhesive interior surface is configured to slide upon said eyeglasses temple when said elastomeric tubular casing is in said first post-production rolled configuration and is configured to resist sliding upon said eyeglasses temple when said elastomeric tubular casing is in said second unrolled configuration.

3. The combination elastomeric tubular casing and elongate eyeglasses temple of claim 1, wherein said elastomeric tubular casing further comprises:
    a first gentle taper from a larger diameter portion of said tube exterior generally central between said tube first and second ends to a smaller diameter portion of said tube exterior adjacent to said tube first end; and
    a second gentle taper from a larger diameter portion of said tube exterior generally central between said tube first and second ends to a smaller diameter portion of said tube exterior adjacent to said tube second end.

4. The combination elastomeric tubular casing and elongate eyeglasses temple of claim 1, wherein said elastomeric tubular casing is adapted to unroll from said first post-production rolled configuration to said second unrolled configuration.

5. The combination elastomeric tubular casing and elongate eyeglasses temple of claim 1, further comprising a hollow core extending longitudinally and uninterrupted entirely through said tubular casing.

6. The combination elastomeric tubular casing and elongate eyeglasses temple of claim 1, wherein said elastomeric tubular casing in said second unrolled configuration terminates prior to either of said first earpiece end and said temple second end.

7. The elastomeric tubular casing of claim 1, wherein said tube first and second ends further comprise bevels.

8. An elastomeric tubular casing, comprising:
    an elastomeric tube defining a tube interior, a tube exterior, a tube first end, and a tube second end distal to said tube first end, said tube interior defining an adhesive surface and said tube exterior defining a non-adhesive surface;
    a first gentle taper from a larger diameter portion of said elastomeric tube exterior generally central between said tube first and second ends to a smaller diameter portion of said elastomeric tube exterior adjacent to said tube first end; and
    a second gentle taper from a larger diameter portion of said elastomeric tube exterior generally central between said tube first and second ends to a smaller diameter portion of said elastomeric tube exterior adjacent to said tube second end;
    said elastomeric tube having a first post-production rolled configuration defining a doughnut geometry, and having a second unrolled configuration defining a generally cylindrical tubular geometry.

9. The elastomeric tubular casing of claim 8, wherein said first and second ends further comprise bevels.

10. The elastomeric tubular casing of claim 8, wherein said elastomeric tube is adapted to unroll from said first post-production rolled configuration to said second unrolled configuration.

11. The elastomeric tubular casing of claim 8, further comprising a hollow core extending longitudinally and uninterrupted entirely through said elastomeric tube.

12. The elastomeric tubular casing of claim 8, further comprising in combination an eyeglasses temple, wherein said elastomeric tubular casing in said second unrolled configuration terminates prior to either of a first eyeglasses temple end and a second eyeglasses temple end, said second eyeglasses temple end distal on said eyeglasses temple to said first eyeglasses temple end.

13. An elastomeric tubular casing configured to encase a medial portion of an eyeglasses temple, comprising:
    a tubular casing interior, a tubular casing exterior, a tubular casing first end, and a tubular casing second end distal to said tubular casing first end, said tubular casing interior defining an adhesive surface and said tubular casing exterior defining a non-adhesive surface;

said elastomeric tubular casing having a first post-production rolled configuration defining an annular geometry generally defining a ring torus with a radial plane section through said rolled elastomeric tubular casing generally defining an Archimedean spiral;

said elastomeric tubular casing having a second unrolled configuration defining a generally cylindrical tubular geometry;

said elastomeric tubular casing configured to unroll from said first post-production rolled configuration encompassing said eyeglasses temple to said second unrolled configuration encasing a medial portion of said eyeglasses temple.

14. The elastomeric tubular casing of claim 13, wherein said tubular casing first and second ends further comprise bevels.

15. The elastomeric tubular casing of claim 13, further comprising:

a first gentle taper from a larger diameter portion of said elastomeric tubular casing exterior generally central between said tubular casing first and second ends to a smaller diameter portion of said elastomeric tubular casing exterior adjacent to said tubular casing first end; and a second gentle taper from a larger diameter portion of said elastomeric tubular casing exterior generally central between said tubular casing first and second ends to a smaller diameter portion of said elastomeric tubular casing exterior adjacent to said tubular casing second end.

16. The elastomeric tubular casing of claim 13, further comprising a hollow core extending longitudinally and uninterrupted entirely through said tubular casing.

17. The elastomeric tubular casing of claim 13, wherein said elastomeric tubular casing in said second unrolled configuration terminates prior to either of a first eyeglasses temple end and a second eyeglasses temple end, said second eyeglasses temple end distal on said eyeglasses temple to said first eyeglasses temple end.

\* \* \* \* \*